(12) United States Patent
Ante et al.

(10) Patent No.: US 6,877,384 B2
(45) Date of Patent: Apr. 12, 2005

(54) PRESSURE MEASUREMENT UNIT MOUNTED IN ENCIRCLING HOUSING

(75) Inventors: Johannes Ante, Regensburg (DE); Markus Gilch, Mauern (DE)

(73) Assignee: First Sensor Technology GmbH, Berlin (DE)

(*) Notice: Subject to any disclaimer, the term of this patent is extended or adjusted under 35 U.S.C. 154(b) by 0 days.

(21) Appl. No.: 10/236,425

(22) Filed: Sep. 5, 2002

(65) Prior Publication Data

US 2003/0070488 A1 Apr. 17, 2003

(30) Foreign Application Priority Data

Sep. 10, 2001  (DE) ......................................... 101 44 367

(51) Int. Cl.[7] ................................................. G01L 7/00
(52) U.S. Cl. ...................................................... 73/756
(58) Field of Search .......................... 73/715–727, 706, 73/756; 361/283.1, 283.2, 283.3, 283.4

(56) References Cited

U.S. PATENT DOCUMENTS

| 4,449,113 A | * | 5/1984 | Gould et al. .................. 338/39 |
| 4,774,626 A | * | 9/1988 | Charboneau et al. .... 361/283.4 |
| 6,543,293 B1 | * | 4/2003 | Kurtz et al. ................... 73/727 |

FOREIGN PATENT DOCUMENTS

| DE | 19736306 | 3/1998 |
| DE | 19946163 | 9/1999 |
| WO | 0123855 | 4/2001 |

OTHER PUBLICATIONS

Bronstein, Semendjajew, "Taschenbuch der Mathematik" published by Harry Deutsch, Thun 1985, p. 199, (no month).

* cited by examiner

*Primary Examiner*—William Oen
(74) *Attorney, Agent, or Firm*—Martin A. Farber

(57) ABSTRACT

A pressure measurement unit in a pressure measurement system has a housing section (8) which has an internal space (9) with internal surfaces, and a ceramic unit (1) which has a pressure diaphragm (2) and at least one external surface, with the ceramic unit (1) held in the press fit in the housing section (8) and with radial holding stresses operating between the external surface of the ceramic unit (1) and the internal surfaces of the housing section (8). A method for manufacturing a corresponding pressure measurement unit with a housing section (8) and with a ceramic unit (1) which has a pressure diaphragm (2) and at least one external surface, with holding stresses built up between the housing section (8) and the ceramic unit (1), which hold the ceramic unit (1) in the internal space of the housing section (8).

16 Claims, 7 Drawing Sheets

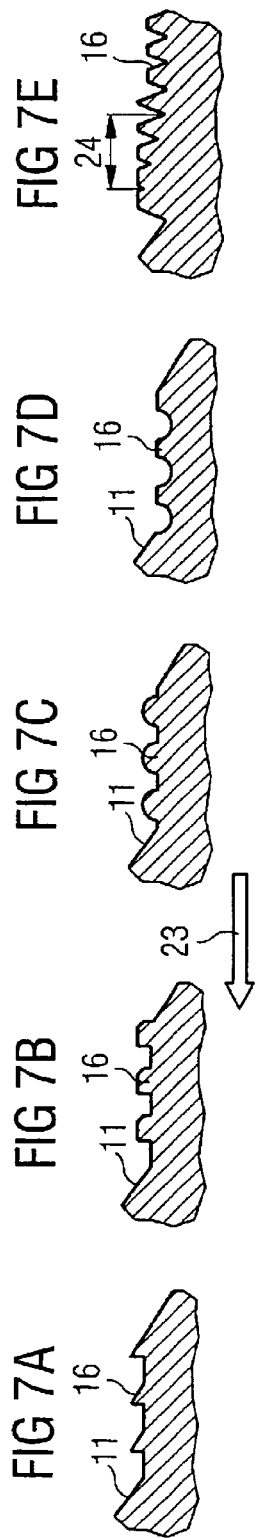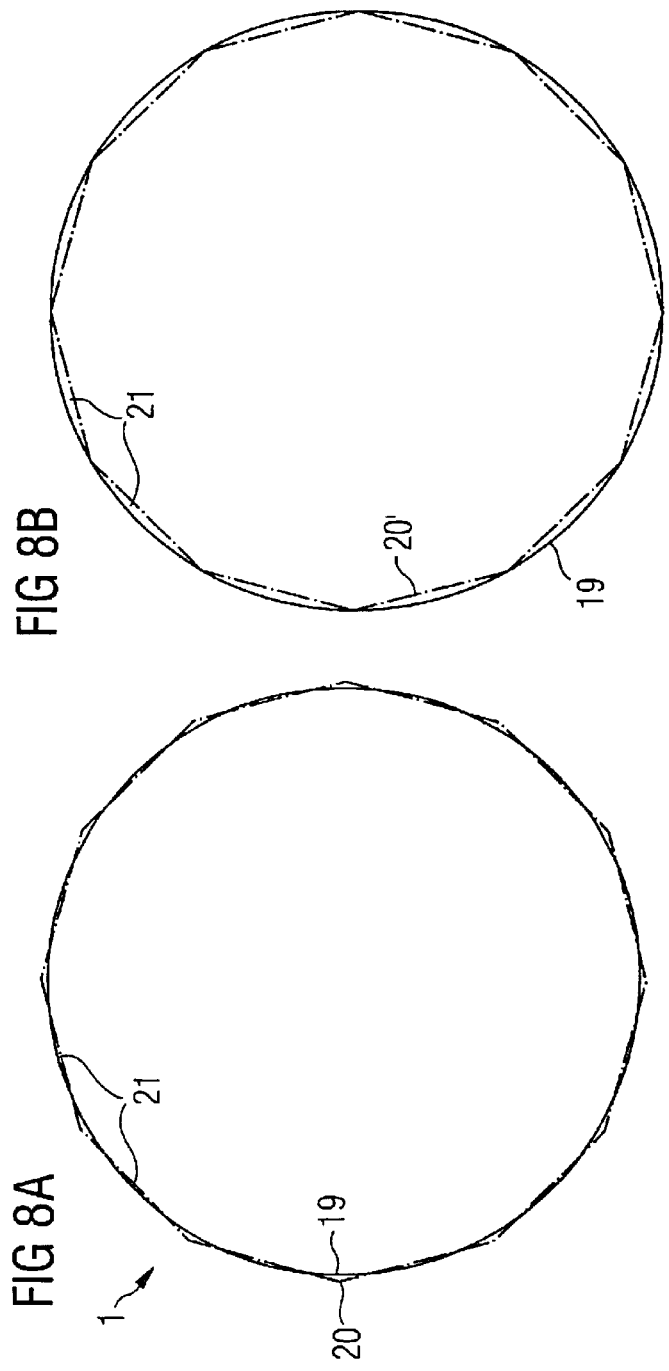

PRESSURE MEASUREMENT UNIT MOUNTED IN ENCIRCLING HOUSING

FIELD AND BACKGROUND OF THE INVENTION

The invention relates to a pressure measurement unit in a pressure measurement system with a housing section, which has an internal space with internal surfaces, and with a ceramic unit, which has a pressure diaphragm and at least one external surface, and to a method for manufacturing a pressure measurement unit with a housing section, which has an internal space with internal surfaces, and with a ceramic unit, which has a pressure diaphragm and at least one external surface.

A pressure measurement system known from DE 199 46 163 has a hat-shaped ceramic unit, which has a diaphragm for pressure measurement and is tensioned by a housing section against a support unit with a sealing element. The hat-shaped configuration of the ceramic unit serves, for example, to attach the ceramic unit with the hat rim to the housing section.

On the housing section is a connector, which is in contact with an elongation measurement element operating as a sensor for the diaphragm. At the time of assembly, appropriate orientation of the housing section and ceramic unit should therefore be ensured.

SUMMARY OF THE INVENTION

The object of the invention is to develop further a pressure measurement unit and manufacturing method as mentioned above, so that assembly is simplified.

This object is achieved with the pressure measurement unit described above, in that the ceramic unit is held in the press fit in the housing section, with radial holding stresses between the external surface of the ceramic unit and the internal surfaces of the housing section. The invention ensures that the ceramic unit is secured reliably against position changes in respect of the housing section even before final assembly. It fixes the ceramic unit immovably in the housing section, so that no position changes can occur between the ceramic unit and the housing section even as a result of later assembly stages. The electrical connections between measurement units located on the pressure diaphragm of the ceramic unit and the housing section are protected against inadvertent damage as a result.

According to the invention the ceramic unit is already held in the housing section itself, so that the ceramic unit is configured more simply and there is therefore no need, for example, for hat-shaped rims or similar expensive configurations. The press fit of the ceramic unit in the housing section produces radial pressure stresses within the ceramic unit, which are very well tolerated by the ceramic unit. Tensile stresses on the other hand do not occur. Also the two components of the pressure measurement unit, in other words the ceramic unit and the housing section, can now have significantly larger manufacturing tolerances than before. This means manufacturing methods are cheaper and subsequent finishing operations are not required. The ceramic unit may, for example, be manufactured as an injection molded part or by hot-pressing, with the housing section on the other hand manufactured by cold-pressing, for example. These production methods are advantageous for the mass production of such components.

A particularly effective press fit of the ceramic unit in the housing section is achieved if the internal surfaces of the housing section, with which the ceramic unit is in contact, are of a softer material than that of the ceramic unit. Pressing the ceramic unit into the softer, for example, metal unit of the housing section then causes displacement of the material on the internal surfaces of the housing section, resulting in a particularly solid connection between the ceramic unit and the housing section.

In principle various combinations of cross-sections are possible for the housing section internal space and the external form of the ceramic unit. It is, for example, therefore conceivable to press a cylindrical ceramic unit into the internal space of a housing section with a square horizontal projection. In this case, there are essentially four connecting surfaces, in which the holding stresses are transferred.

Larger connecting surfaces can be obtained if both the ceramic unit and the internal space of the housing section are essentially cylindrical. Then an almost regular load distribution advantageously occurs on the external surface of the ceramic unit.

The terms cylindrical and cylinder are used here in the mathematical sense, in other words for a unit which is bounded by a cylindrical surface (generated surface) and two parallel planes, the base surfaces of the cylinder, (see Bronstein, Semendjajew, "Taschenbuch der Mathematik" (Handbook of Mathematics), published by Harry Deutsch, Thun 1985, page 199). According to this, cylinders are also bodies, the base surfaces of which are not circular, but, for example, square or polygonal.

In order to achieve as regular a distribution as possible of the radial holding stress and at the same time also to allow regular material displacement along the contact surfaces, it is advantageous to provide areas on the one hand in a regular sequence along the circumference of the ceramic unit or the internal circumference of the housing section, in which material is displaced, and on the other hand areas, into which some of the displaced material can move. For this purpose, for example, the external surfaces of the ceramic unit can be flattened off to polygonal in the area in which they are in contact with the internal surfaces of the housing section and in which holding stresses are transferred, and the internal space of the housing section can be configured as circular.

In this embodiment the maximum diameter of the internal space of the housing section is of smaller dimension in the area in which holding stresses occur than thee external diameter of the ceramic unit of polygonal cross-section and the minimum diameter of the internal space of the housing section is larger in the area in which holding stresses occur than the internal diameter of the polygon formed by the contact surfaces of the ceramic unit.

The internal surfaces of the internal space of the housing section can also be advantageously configured to favor a regular material displacement and therefore also as regular a build-up of holding stresses as possible. Any regular profiling of the internal surfaces is appropriate for this purpose in principle.

For the purposes of simple manufacture, it is possible to groove the internal surfaces of the housing section, on which holding stresses act. This ensures regular material displace inert when the ceramic unit is pressed in. If the grooves run along the direction of insertion of the ceramic unit, the ceramic unit is also guided during insertion in the internal space of the housing section.

As an alternative to profiling the internal surfaces of the housing section and flattening the contact surfaces of the ceramic unit, it is possible to position a corrugated sleeve between the internal surfaces of the ceramic Unit and the external surface of the ceramic unit. The press fit is then primarily generated by the deformation of the sleeve, forced against the material resistance of the corrugated sleeve. A structure is also achieved, in which the dimensions of the ceramic unit and the internal space of the housing section are subject to fewer requirements relating to dimensional accuracy.

In order not to falsify the deformation characteristics of the diaphragm formed on the ceramic unit, it must be ensured that attachment of the ceramic unit within the housing section does not cause deformation forces to act on the diaphragm. This can be achieved particularly easily, if the ceramic unit is advantageously configured so that it is not held in the housing section in the portion in which the pressure diaphragm is located.

For positionally accurate assembly, it is useful to determine an insertion position for the ceramic unit in the housing section. For this, it is possible to provide an insertion limit in the form of a stop on the housing section and/or on the ceramic unit. Advantageously the ceramic unit is configured such that its external surface(s) has/have a stepped or conical portion, which acts in combination with a corresponding stop surface on the housing section. The internal surface of the housing section acting in combination with a conical portion of the ceramic unit can be formed, in an advantageous embodiment of the invention, by the thread runout of a thread, which at the same time forms the grooving of the internal surfaces of the housing section, as mentioned.

It is essential for the smooth functioning of the pressure measurement system that pressure loss within the measurement system is prevented. The components under pressure are therefore connected in a pressure-tight fashion in respect of each other. For example, the press fit of the ceramic unit in the housing section can be used to ensure a pressure-tight connection between these two components. All that is needed then is a further seal between the housing section and a support unit, which supplied pressure to the ceramic unit.

If the press fit is not sealed off, a suitable seal must be provided. According to an advantageous development of the invention, a seal is positioned between the ceramic unit and the support unit, so that the connection between the ceramic unit and the housing section does not have to be pressure-tight.

The above-mentioned object is also achieved by a method, in which radial holding stresses are generated between the housing section and the ceramic unit, holding the ceramic unit in the internal space of the housing section, to manufacture a pressure measurement unit with a housing section which has an internal space with internal surfaces, and with a ceramic unit which has a pressure diaphragm and at least one external surface.

A press fit is therefore manufactured for the ceramic unit within the housing section, ensuring that the position of the ceramic unit cannot be inadvertently changed in relation to the housing section during further assembly stages. The housing section and ceramic unit can also be manufactured with large tolerances, considerably simplifying the production of such parts.

This press fit can be achieved by displacing the material of the housing section during insertion of the ceramic unit into the internal space of the housing section. This produces a solid connection between the ceramic unit and the housing section, permanently preventing any relative movement of the two components in respect of each other.

As an alternative to this, it is also possible to achieve displacement of the housing section material or even just tensioning of the ceramic unit within the housing section, by applying forces after insertion of the ceramic unit into the internal space of the housing section, to generate the holding stresses.

This can be achieved, for example, by pushing a ring onto the external surfaces of the housing section after insertion of the ceramic unit into the internal space of the housing section using a housing section with conical external surfaces or pressing the housing section with the ceramic unit inserted into a further component. The advantage of this design is principally that the internal surfaces of the housing section, which are difficult to access, do not have to be processed, that the internal space of the housing section is not adversely affected by the insertion procedure and that the connection between the housing section and the ceramic unit can be configured so that it is removable, In this way, a simple seal of this type can also be achieved between the ceramic unit and the housing section.

Holding stresses, which do not necessarily have to be generated by deformation or material displacement of one of the two parts, are a decisive factor for the secure fit of the ceramic unit within the housing section. Separate tensioning elements can be used equally well, which generate holding stresses between the housing section and the ceramic unit. Advantageously a corrugated sleeve is used for this purpose, which is inserted into the internal space of the housing section and pressed into the [???] of the ceramic units against the deformation resistance of the material of the corrugated sleeve.

In all the above-mentioned methods of manufacture the holding stresses are generated by the mechanical application of forces. This means that local stress peaks can occur, for example due to processing errors, which may result in damage or material fatigue. It is therefore particularly advantageous for the holding stresses between the housing section and the ceramic unit to be generated by heat shrinking.

BRIEF DESCRIPTION OF THE DRAWINGS

The invention is described below in more detail using drawings by way of an example. The drawings show.

DETAILED DESCRIPTION OF THE PREFERRED EMBODIMENT

Figure 1:
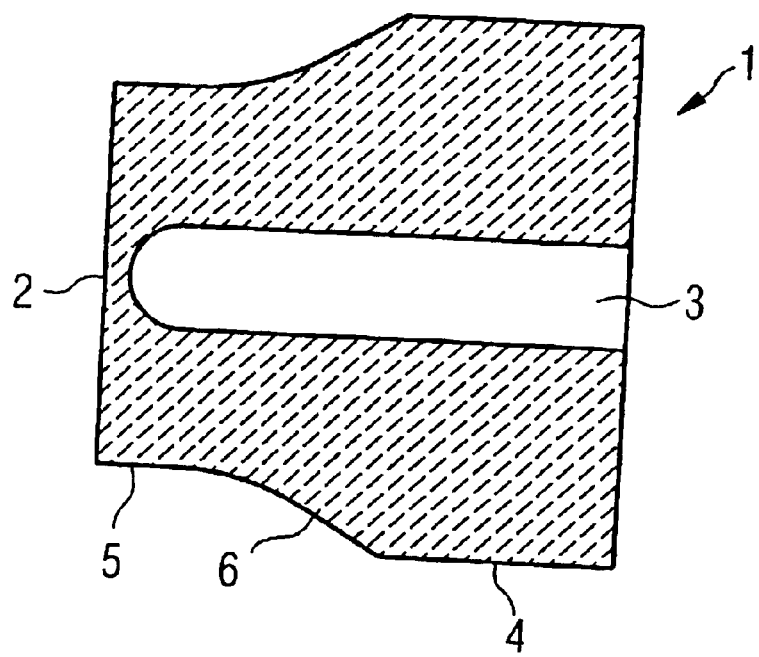
FIG. 1 a longitudinal section of a ceramic unit.

The ceramic unit 1 shown in FIG. 1 is intended for deployment in a pressure measurement system. According to the above definition, it has essentially cylindrical portions. On one front face it has a pressure diaphragm 2, to which pressure is supplied via a blind hole 3, which runs along a longitudinal axis, not shown separately, of the ceramic unit 1. Systems on the pressure diaphragm 2, which measure its deflection due to the effect of pressure, are also not shown.

Figure 2:
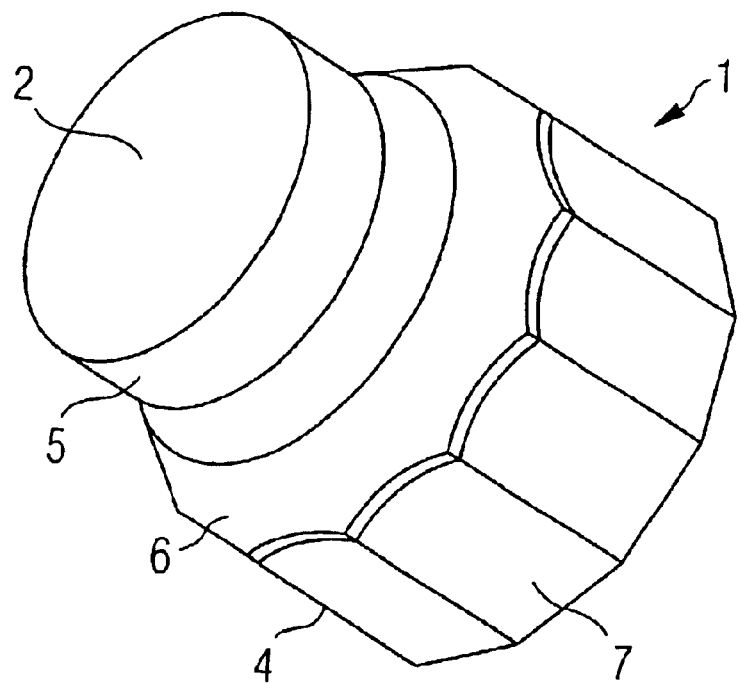
FIG. 2 a spatial illustration of the ceramic unit in FIG. 1.

The generated surface of the ceramic unit 1 is divided into an area 4 with a larger external diameter, an area 5 with a smaller external diameter and a conical transition area 6 between these two areas. The generated surface of the area 4, as shown in FIG. 2, is flattened off so that there are a plurality of polygonal surfaces 7 on the generated surface of the area 2.

Figure 3:
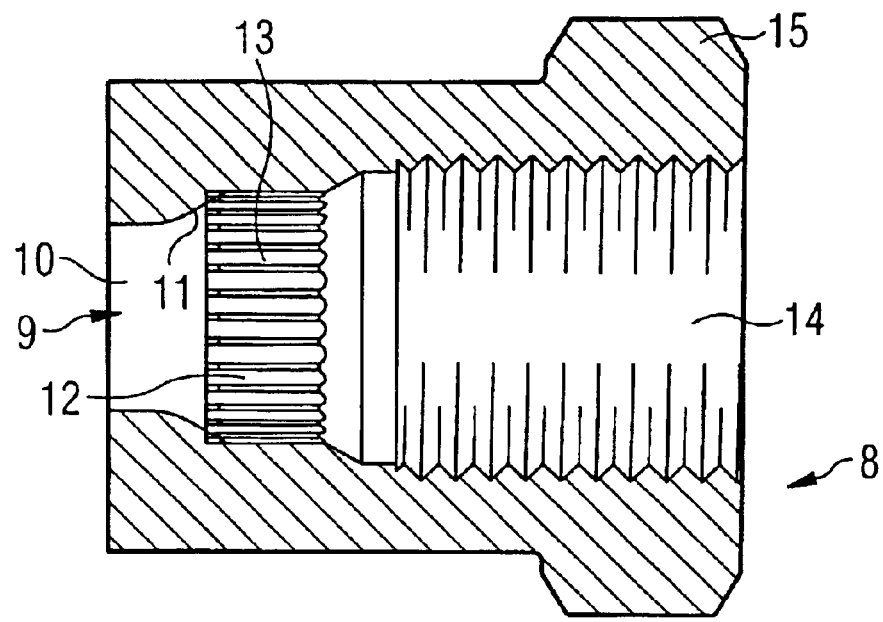
FIG. 3 a longitudinal section through a housing section.

Within the pressure measurement sensor the ceramic unit 1 is inserted in a metal housing section 8, as shown in FIG. 3. This housing section 8 is also essentially cylindrical and has an internal space 9 open to the front faces of the housing section 8 along its longitudinal axis. The internal space 9 is divided into the following portions: a cylindrical portion 10 is followed by a portion 11 which opens up conically to a cylindrical area 12, which has longitudinal profiling 13. This means that the internal surface of the housing section 8 is profiled in the area 12. Instead of the longitudinal profiling 13, transverse profiling or a smooth design could be specified, as explained later. A portion 14, which is used to connect a support unit as described later, is in contact with the area 12. In this last portion 14, the housing section 8 has key flanks 15 on its outside and these can be used to assemble the housing section 8.

Figure 4:
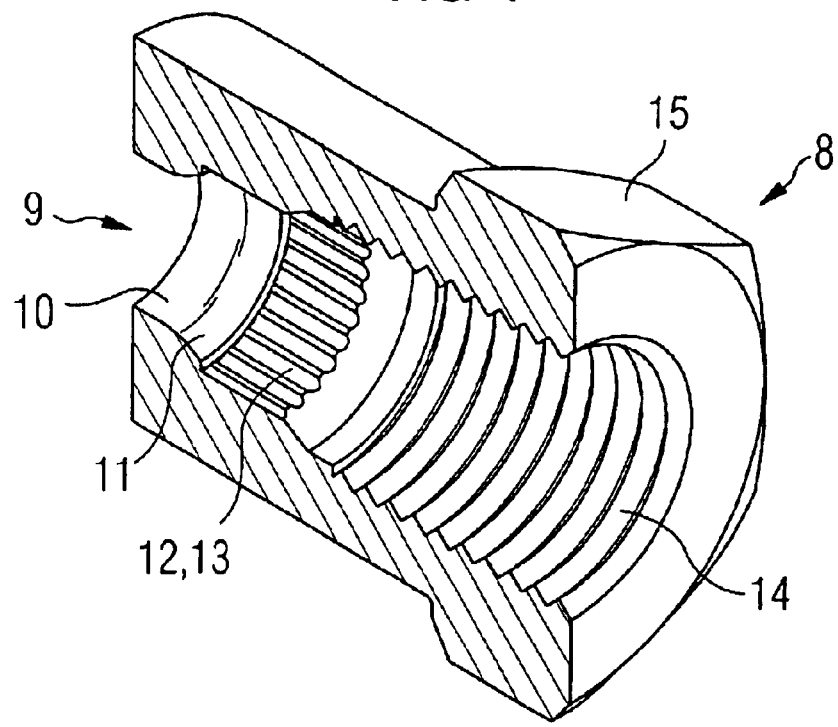
FIG. 4 a spatial illustration of the housing section in FIG. 3 with a section in the axis of symmetry, FIG. 5 a spatial illustration of a halved housing section with a ceramic unit already inserted and also halved, FIG. 6 a sectional view of the housing section with the support unit in FIG. 5 inserted, FIG. 7 examples of transverse profiling of the housing section on its internal surfaces, FIG. 8 maximum and minimum internal diameters of an unprofiled housing section based on the external diameter of the ceramic unit and FIG. 9 maximum and minimum internal diameters of transverse profiling of the housing section based on the external diameter of the ceramic unit, FIG. 10 embodiments of longitudinal profiling of the housing section in combination with the ceramic unit and FIG. 11 insertion of a corrugated sleeve between an unprofiled housing section and a ceramic unit.
Figure 5:
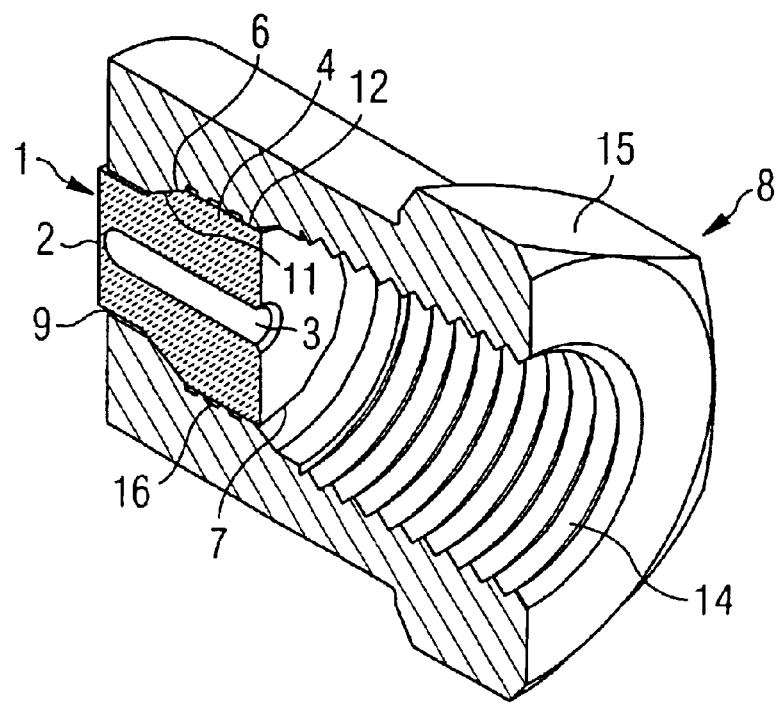
Figure 6:
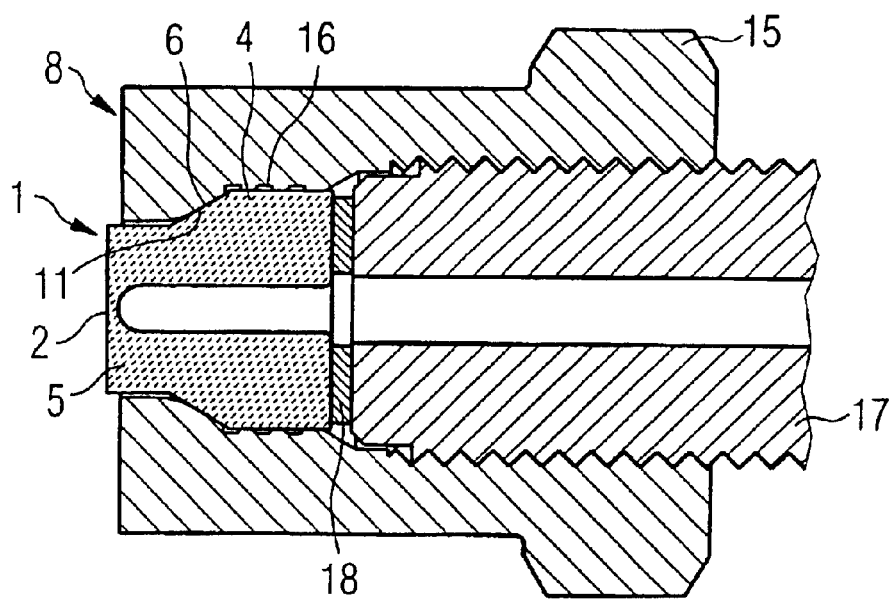

FIGS. 5 and 6 show a section through the ceramic unit 1 inserted into the housing section 8. This is inserted into the internal space 9 of the housing section 8 from the portion 14 side during assembly of the pressure measurement sensor. The portion 4 of the ceramic unit 1 must then be pressed into the area 12 of the housing section 8 using force, because the external radius of the polygonal portion 4 of the ceramic unit 1 is bigger than the radius of the internal space 9 of the housing section 8 due to its dimensioning, as explained below. The metal material of the housing section 8, which is therefore softer than the ceramic material of the ceramic unit 1 is deformed as a result and a press fit is achieved within the housing section 8 for the ceramic unit 1. The transverse profiling 16, and the longitudinal profiling shown in FIGS. 3 and 4, favor regular deformation, which will be described in more detail later, on the internal surface of the area 12, due to their regular sequence of studs, which are exposed to the inward pressure force transferred by the ceramic unit 1, and due to grooves which remain stress-free. This means that the ceramic unit 1 is not twisted or tilted inadvertently during the insertion process.

In the assembled state, the polygonal surfaces 7 of the area 4 of the ceramic unit 1 are indented by deformation with the internal surfaces of the cylindrical area 12 of the housing section 8. The insertion process is terminated when the conical transition area 6 of the ceramic unit 1 comes to rest in the conical portion 11 on the internal surface of the housing section 8. Then only the area 5 of the ceramic unit 1 is free from contact in the internal space 9 of the housing section 8, in portion 10.

The press fit of the ceramic unit 1 in the housing section 8 is generated in the area 12 of the housing section 8 and in the area 4 of the ceramic unit 1. Holding stress forces are initiated there. Other areas of the ceramic unit 1, in particular area 5, in which the pressure diaphragm 2 is located, remain unaffected by the holding stresses produced by the press fit within the ceramic unit 1. This means that the deformation characteristics of the pressure diaphragm 2 are not changed by the holding stresses.

The holding stresses also occur predominantly radially in respect of the longitudinal axis of the ceramic unit 1, so they operate essentially as a pressure stress, which is tolerated well by the ceramic material of the ceramic unit 1.

The pressure diaphragm 2 of the ceramic unit 1 projects in the final state beyond the front face of the housing section 8 and thereby allows easy access for the above-mentioned pressure sensor systems to the pressure diaphragm 2.

FIG. 6 also shows a support unit 17, which is inserted in the portion 14 of the housing section 8. It is used, among other things, to convey the pressure to be measured to the pressure diaphragm 6. A seal 18 is located between the support unit 17 and the ceramic unit 1. This arrangement means that there is no need for a pressure-tight connection between the ceramic unit 1 and the housing section 8 or for further sealing systems between the support unit 17 and the housing section 8.

FIG. 7 shows examples of the possible transverse profiling of the internal surface of the housing section 8 in the area 12: FIGS. 7a to 7d show a saw-tooth profile, a tooth profile with plateau-type flattened areas, a profile with rounded projections and one with rounded-off indentations. They all have in common the fact that they run into a conical portion 11 at their ends in respect of the insertion direction 23.

If the transverse profiling is generated by the cutting of a thread (FIG. 7e), the thread runout 24 advantageously serves as the conical portion 11. The conical portion 11 in this case results from the fact that the conical transition area 6 is pressed into an area of the housing section 8 with increasing deformation resistance, resulting from the decreasing thread depth in the material of the housing section 8 in the direction of insertion 23. The process of inserting the ceramic unit 1 into the housing section 8 then comes to a gradual stop rather than a sudden stop, unlike the examples shown in FIGS. 7a to 7d.

Figure 9B:
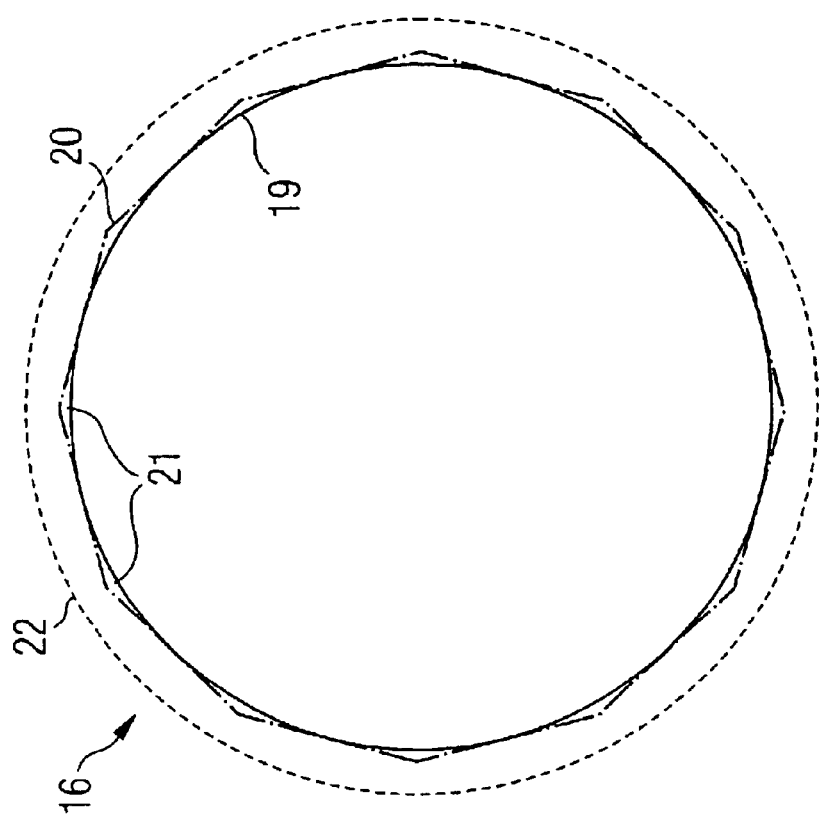
Figure 9A:
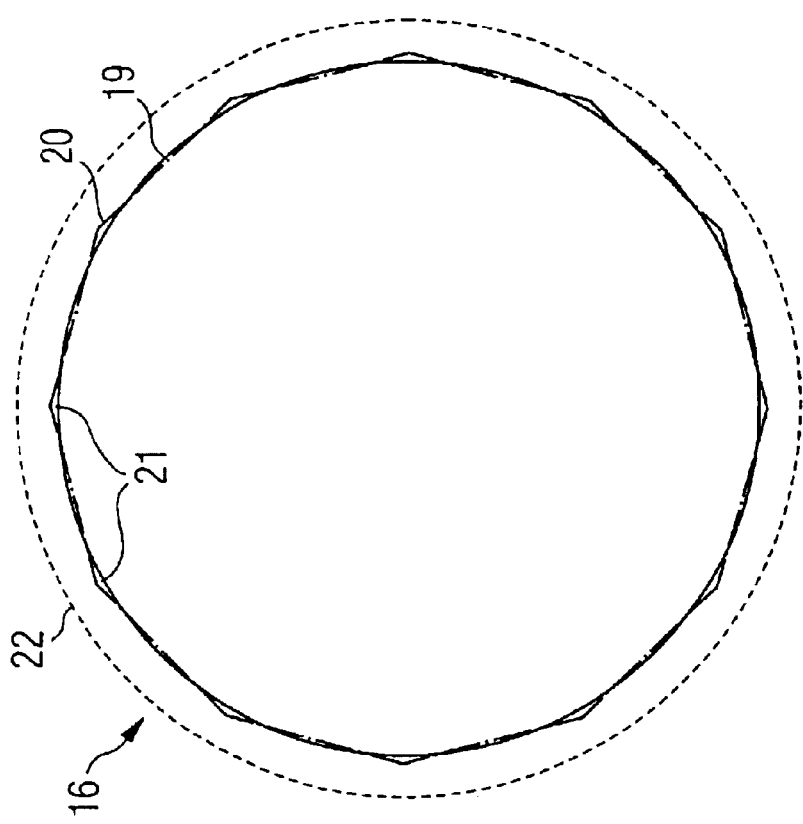
Figure 10B:
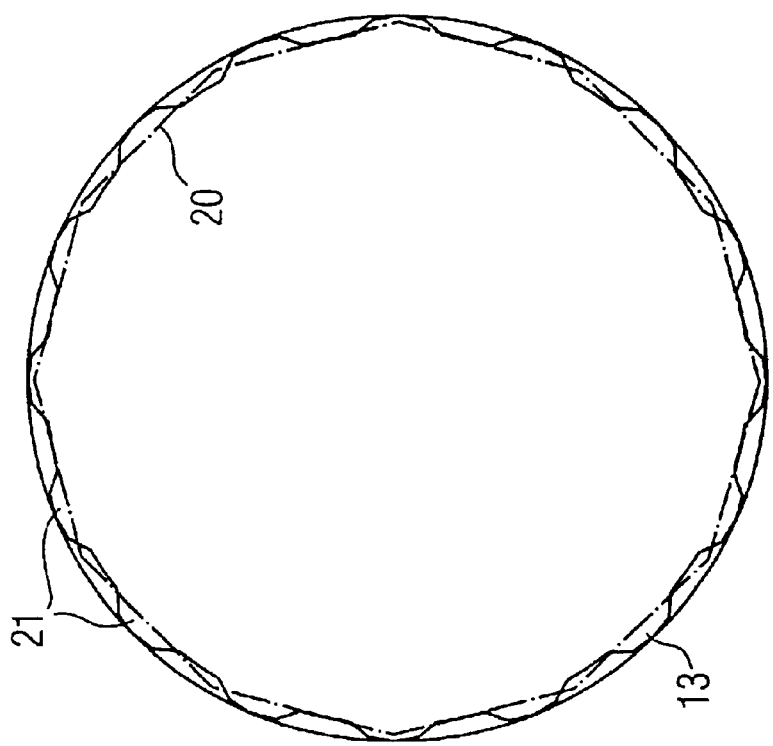
Figure 10A:
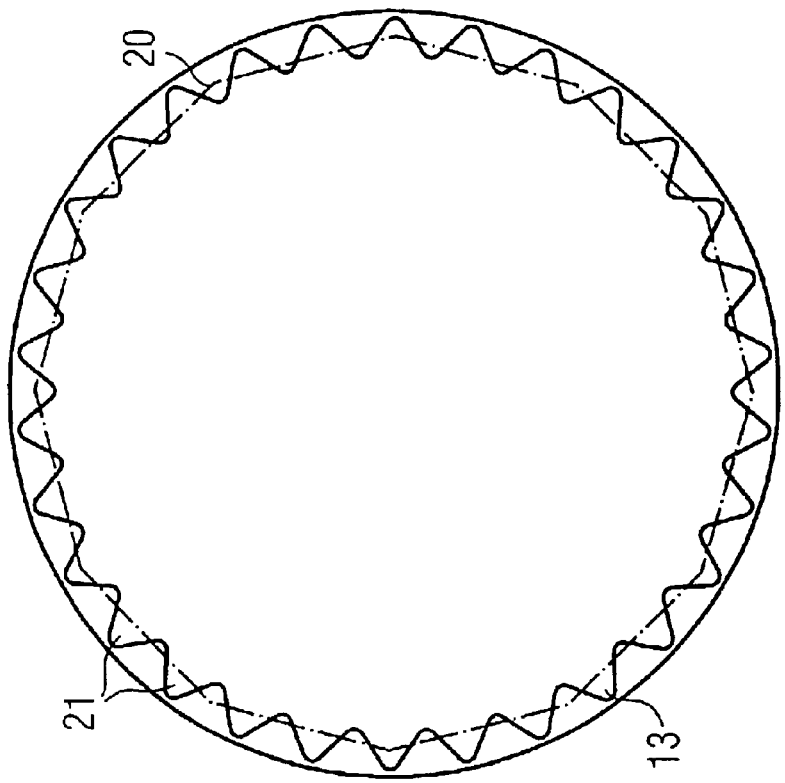

The following FIGS. 8 to 10 show embodiments of a press fit between a ceramic unit 1 with a polygonally configured area 4 and a housing section 8 with a cylindrical internal space. This is shown as the internal space outline 9. FIGS. 8 and 9 each show the maximum and minimum design dimensions for the radius of the internal space outline 19 for a given external diameter of the area 4, flattened off to a polygon, of the ceramic unit 1. These figures also give details of the permitted manufacturing tolerances.

FIG. 8 shows two extreme situations, namely the smallest (FIG. 5a) and the largest permitted radius (FIG. 8b) of the internal space outline 19 for the housing section 8, the internal surface of which is not profiled in the area 12, and into which a ceramic unit 1 with the same radius as the polygonal outline 20 of area 4 is pressed. The smallest possible radius of the internal space outline 19 is limited by the fact that there are still intermediate spaces 21 between the internal space outline 19 and the polygonal outline 20, into which some of the material of the housing section 8, displaced from area 4 of the ceramic unit, can move when the ceramic unit 1 is pressed into the housing section 8 (FIG. 8a). The maximum radius of the internal space outline 19 is limited by the fact that the corners of the polygonal outline 20 can still work into the internal surfaces of the housing section 8. This results in the biggest possible intermediate spaces 21, as shown in FIG. 8b.

FIG. 9 shows the proportions of a housing section 8 with transverse profiling 16 of the area 12. On the one hand the internal space outline 19 of the housing section 8 is shown in concentric circles, on the other hand the base of the groove 22 of the transverse profiling 16. In principle this gives the same proportions as in FIG. 8. Compared with the unprofiled embodiment of the internal space 9 of the housing section 8, the grooves of the transverse profiling 16 already allow space for expansion for the material of the housing section 8 displaced during insertion of the ceramic unit 1.

FIG. 10 shows two possible longitudinal profiles 13 for an area 12 of the housing section 8. The major form differences between the polygonal outline 20 and the internal outline of the internal space 9 of the housing section 8 due to longitudinal profiling 13 result in intermediate spaces 21, into which material from the housing section 8 displaced by the ceramic unit 1 can move. At the same time longitudinal profiling 13 is used to guide the ceramic unit 1 within the housing section 8 to prevent twisting during the insertion process.

Figure 11:
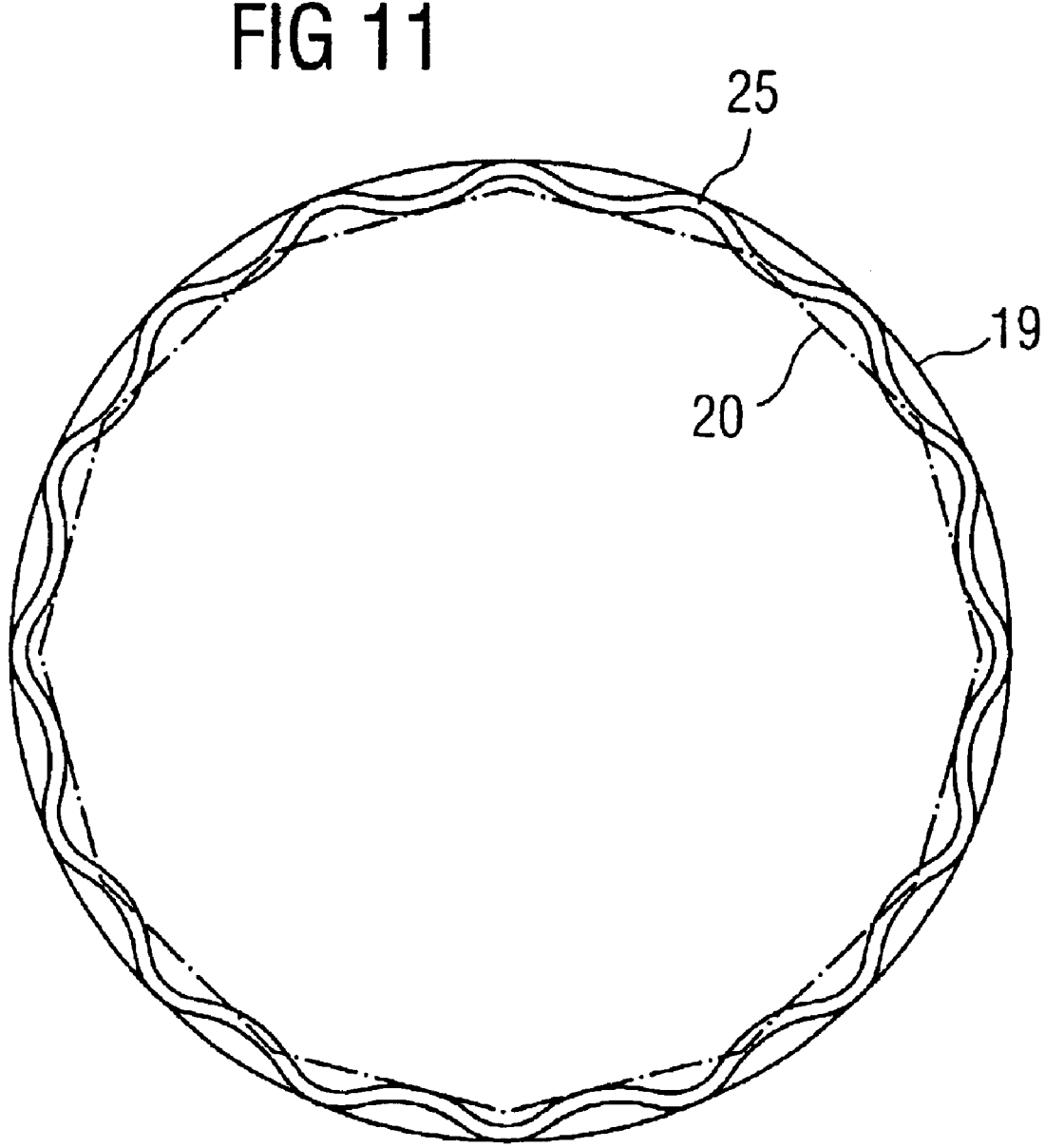

If deformation of the housing section 8 is to be avoided during insertion under pressure of the ceramic unit 1, a specific component can be used which fulfils this function. As shown in FIG. 11, a corrugated sleeve 25 can be inserted into the internal space 9 of the housing section 8, into which the ceramic unit 1 is then pressed, The holding stresses creating the press fit then result from deformation of the corrugated sleeve 25. Because in this embodiment the external outline of the area 4 of the ceramic unit 1 and the internal outline of the housing section 8 do not have to correspond completely to each other, both components can be manufactured with significantly larger tolerances and even with form differences.

What is claimed is:

1. Pressure measurement unit in a pressure measurement system, with a housing section (8), which has an internal space (9) with an internal surface, and with a ceramic unit (1) which has a pressure diaphragm (2) and at least one external surface, wherein
the ceramic unit (1) is held in the housing section (8) in a press fit, resulting in radial holding stresses between the external surface of the ceramic unit (1) and the internal surface of the housing section (8), wherein the radial holding stresses are parallel to a plane of the pressure diaphragm.

2. Pressure measurement unit according to claim 1, wherein the internal surface of the housing section (8) is of a softer material than that of the ceramic unit (1), specifically metal, and the press fit results from displacement of material of the internal surface due to insertion of the ceramic unit (1) into the internal space (9) of the housing section (8).

3. Pressure measurement unit according to claim 1, wherein the ceramic unit (1) and the internal space (9) of the housing section (8) have cylindrical portions.

4. Pressure measurement unit according to claim 3, wherein in each area in which holding stresses occur, the external surface of the ceramic unit (1) is flattened off to a polygon and the internal space (9) of the housing section (8) is circular in section.

5. Pressure measurement unit according to claim 4, wherein maximum diameter of the internal space (9) of the housing section (8) is smaller in an area in which holding stresses occur than external diameter of the polygon formed by the contact surfaces (7) of the ceramic unit (1) and minimum diameter of the internal space (9) of the housing section (8) is larger in an area in which holding stresses occur than internal diameter of the polygon formed by the contact surfaces (7) of the ceramic unit (1).

6. Pressure measurement unit according to claim 1, wherein the internal surfaces of the housing section (8), on which the holding stresses act, are grooved.

7. Pressure measurement unit according to claim 1, wherein a corrugated sleeve (25) is positioned between the internal surfaces of the housing section (8) and the external surface of the ceramic unit (1).

8. Pressure measurement unit according to claim 1, wherein the ceramic unit (1) is not held in the press fit in the housing section (8) in a portion (5) in which the pressure diaphragm (2) is located.

9. Pressure measurement unit according to claim 1, wherein the ceramic unit (1) has a conical or stepped portion (6) on its external surface(s).

10. Pressure measurement unit according to claim 6, wherein the ceramic unit (1) has a conical or stepped portion (6) on its external surface(s), and wherein grooving is formed by a thread, thread runout (24) of which serves as a transition area (11).

11. Pressure measurement unit according to claim 1, further comprising a support unit (17), which supplies pressure to the ceramic unit (1), with a seal (18) positioned between the ceramic unit (1) and the support unit(17).

12. Method for manufacturing a pressure measurement unit with a housing section (8), which has an internal space (9) with internal surfaces, and with a ceramic unit (1), which has a pressure diaphragm (2) and at least one external surface, comprising the step of building up radial holding stresses between the housing section (8) and the ceramic unit (1), which hold the ceramic unit (1) in the internal space (9) of the housing section (8), wherein the radial holding stresses are parallel to a plane of the pressure diaphragm.

13. Method according to claim 12, wherein the holding stresses are built up by displacement of housing section material during insertion of the ceramic unit (1) into the internal space (9) of the housing section (8).

14. Method according to claim 12, wherein when the ceramic unit (1) is already inserted into the internal space (9) of the housing section (8), the holding stresses are generated by displacement of housing section material due to forces acting on the external surfaces of the housing section (8).

15. Method according to claim 12, wherein a corrugated sleeve (25) is inserted into the internal space (9) of the housing section (8), the ceramic unit (1) then being pressed into said sleeve.

16. Method according to claim 12, wherein a press fit of the ceramic unit (1) in the housing section (8) is made by heat shrinking of the housing section (8).

* * * * *